US011985394B2

(12) United States Patent
Fonseca, Jr. et al.

(10) Patent No.: US 11,985,394 B2
(45) Date of Patent: May 14, 2024

(54) SYSTEM AND METHOD FOR DETECTING ADVERTISEMENTS IN MULTIMEDIA ASSETS

(71) Applicant: ARRIS Enterprises LLC, Suwanee, GA (US)

(72) Inventors: Benedito J. Fonseca, Jr., Glen Ellyn, IL (US); Faisal Ishtiaq, Plainfield, IL (US); Anthony J. Braskich, Palatine, IL (US); Venugopal Vasudevan, Palatine, IL (US); Isselmou Ould Dellahy, Lake in the Hills, IL (US)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

(21) Appl. No.: 17/702,269

(22) Filed: Mar. 23, 2022

(65) Prior Publication Data

US 2022/0217450 A1    Jul. 7, 2022

Related U.S. Application Data

(62) Division of application No. 15/235,990, filed on Aug. 12, 2016, now Pat. No. 11,317,168.
(Continued)

(51) Int. Cl.
*H04N 21/233*    (2011.01)
*G06F 16/48*    (2019.01)
(Continued)

(52) U.S. Cl.
CPC ........... *H04N 21/812* (2013.01); *G06F 16/48* (2019.01); *G06F 16/683* (2019.01);
(Continued)

(58) Field of Classification Search
None
See application file for complete search history.

(56) References Cited

U.S. PATENT DOCUMENTS 8,949,872 B2    2/2015 Slaney et al.
2004/0194130 A1    9/2004 Konig et al.
(Continued)

FOREIGN PATENT DOCUMENTS

WO    9820675 A1    5/1998
WO    2011041008 A1    4/2011

OTHER PUBLICATIONS

I. Doring, et al., "Mining TV Broadcasts 24/7 for Recurring Video Sequences", Video Search and Mining, SCI 287, DP-327-356.
(Continued)

*Primary Examiner* — Brian T Pendleton
*Assistant Examiner* — Jean D Saint Cyr
(74) *Attorney, Agent, or Firm* — Panitch Schwarze Belisario & Nadel LLC

(57) ABSTRACT

Systems and methods for determining the location of advertisements in multimedia assets are disclosed. A method includes obtaining an audio signature corresponding to a time period of a multimedia asset, identifying a match between the obtained audio signature and one or more stored audio signatures, comparing programming data of the multimedia assets of the obtained audio signature and the matching audio signatures, and determining whether the time period of the multimedia asset contains an advertisement based on the comparison of the programming data of the multimedia assets of the obtained audio signature and the one or more matching audio signatures. Another method includes identifying matches between a plurality of obtained audio signatures and a plurality of stored audio signatures, and determining whether consecutive time periods of the multimedia asset contain an advertisement based on a num-
(Continued)

ber of consecutive matching audio signatures of the plurality of stored audio signatures.

20 Claims, 11 Drawing Sheets

Related U.S. Application Data

(60) Provisional application No. 62/204,637, filed on Aug. 13, 2015.

(51) Int. Cl.
| | |
|---|---|
| *G06F 16/683* | (2019.01) |
| *G10L 19/018* | (2013.01) |
| *G10L 25/51* | (2013.01) |
| *H04N 21/234* | (2011.01) |
| *H04N 21/2389* | (2011.01) |
| *H04N 21/278* | (2011.01) |
| *H04N 21/439* | (2011.01) |
| *H04N 21/81* | (2011.01) |
| *H04N 21/84* | (2011.01) |
| *H04N 21/845* | (2011.01) |
| *H04N 21/482* | (2011.01) |

(52) U.S. Cl.
CPC ............ *G10L 19/018* (2013.01); *G10L 25/51* (2013.01); *H04N 21/233* (2013.01); *H04N 21/234* (2013.01); *H04N 21/278* (2013.01); *H04N 21/4394* (2013.01); *H04N 21/84* (2013.01); *H04N 21/8456* (2013.01); *H04N 21/4821* (2013.01)

(56) References Cited

U.S. PATENT DOCUMENTS

| | | | |
|---|---|---|---|
| 2004/0237102 A1 | 11/2004 | Konig et al. | |
| 2005/0149968 A1 | 7/2005 | Konig et al. | |
| 2007/0250856 A1 | 10/2007 | Leavens et al. | |
| 2011/0078020 A1* | 3/2011 | LaJoie ................ | G06F 16/683 |
| | | | 707/E17.014 |
| 2013/0198773 A1 | 8/2013 | Jentz et al. | |
| 2014/0007156 A1 | 1/2014 | Navin et al. | |
| 2014/0282662 A1 | 9/2014 | Major | |
| 2014/0282667 A1 | 9/2014 | Major et al. | |
| 2014/0282671 A1* | 9/2014 | McMillan ........ | H04N 21/44008 |
| | | | 725/19 |
| 2014/0330413 A1* | 11/2014 | Anniballi .............. | G06F 16/683 |
| | | | 700/94 |
| 2015/0127710 A1* | 5/2015 | Ady ........................ | H04L 67/51 |
| | | | 709/202 |

OTHER PUBLICATIONS

J. Gauch, et al., "Identification of new commercials using repeated video sequence detection", Image Processing ICIP 2005, 4 pgs.
K. M. Pua, et al., "Real time repeated video sequence identification", Computer Vision and Image Understanding 93 (2004) pp. 310-327.
Office Action dated May 25, 2020, by the German Patent Office in corresponding Germany Patent Application No. 11 2016 003 694.9 and an English Translation of the Office Action. (9 pages).
PCT Search Report & Written Opinion, RE: Application No. PCT/US2016/046841, dated Oct. 20, 2016.
R. Lienhart, et al., "On the detection and recognition of television commercials", Multimedia Computing and Systems '97. Proceedings, IEEE International Conference on, 18 pgs.

* cited by examiner

SYSTEM AND METHOD FOR DETECTING ADVERTISEMENTS IN MULTIMEDIA ASSETS

This Application is a divisional application to and claims priority to U.S. Utility application Ser. No. 15/235,990, filed Aug. 12, 2016, which claims priority from earlier filed U.S. Provisional Application Ser. No. 62/204,637, filed Aug. 13, 2015, the entire contents of each is hereby incorporated by reference.

This Application claims priority from earlier filed U.S. Provisional Application Ser. No. 62/204,637, filed Aug. 13, 2015, which is hereby incorporated by reference.

TECHNICAL FIELD

The present disclosure relates to the field of multimedia identification and recognition, and more particularly, to systems and methods for identifying or recognizing advertisements in audiovisual multimedia, such as television programming.

BACKGROUND

Generally, audiovisual multimedia content such as television programming or video streaming includes embedded advertisements. Determining the location of advertisements in the multimedia content may be desirable, for example, to enable removal or replacement of advertisements. Markers (sometimes referred to as "bumpers") may be used to denote the beginning and ending of advertisements in certain multimedia content. However, often such markers are not used. Because the location and length of advertisements is often variable, excessive human involvement may be required to identify the location of advertisements.

SUMMARY

The present disclosure describes systems and methods for determining the location of advertisements in multimedia assets.

One example method includes obtaining an audio signature corresponding to a time period of a multimedia asset, identifying a match between the obtained audio signature and one or more stored audio signatures, comparing programming data of the multimedia assets of the obtained audio signature and the one or more matching audio signatures, and determining whether the time period of the multimedia asset contains an advertisement based on the comparison of the programming data of the multimedia assets of the obtained audio signature and the one or more matching audio signatures.

Another example method includes obtaining a plurality of audio signatures corresponding to consecutive time periods of the multimedia asset, identifying matches between the obtained audio signatures and a plurality of stored audio signatures, and determining whether the consecutive time periods of the multimedia asset contain an advertisement based on a number of consecutive matching audio signatures of the plurality of stored audio signatures.

One example system includes a receiver, a computer memory, and a processor. The receiver is connected to receive audio and video data from a multimedia stream. The computer memory contains a database of one or more stored audio signatures. The stored audio signatures correspond to time periods of a plurality of multimedia assets. The processor is in communication with the receiver and the computer memory. The processor is programmed to obtain an audio signature corresponding to a time period of a multimedia asset in the multimedia stream, identify a match between the obtained audio signature and the one or more stored audio signature, compare programming data of the multimedia assets of the obtained audio signature and the one or more matching audio signatures, and determine whether the time period of the multimedia asset contains an advertisement based on the comparison of the programming data of the multimedia assets of the obtained audio signature and the one or more matching audio signatures. In addition to the above system, a non-transitory computer readable medium may contain computer instructions to cause a computer to perform the above steps.

BRIEF DESCRIPTION OF THE DRAWINGS

Further details of the example implementations are explained with the help of the attached drawings in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

The example systems and methods described below detect the location of advertisements in multimedia assets such as television programs. These examples provide advantages over conventional systems in that they may require less human involvement, and in some cases little or no human involvement, to identify and catalog the advertisements. Further, these examples provide advantages over conventional systems in that they do not require the use of markers (such as frames corresponding to a bumper segment or audio tones or signals) to identify the location, or the beginning of ending, of advertisements in multimedia assets. These examples may offer enhanced precision in advertisement detection over conventional systems. By determining the location of advertisements in multimedia assets, the example systems and methods herein may be used to enable automatic removal of advertisements or automatic replacement of advertisements during later viewing of stored multimedia assets.

Figure 1:
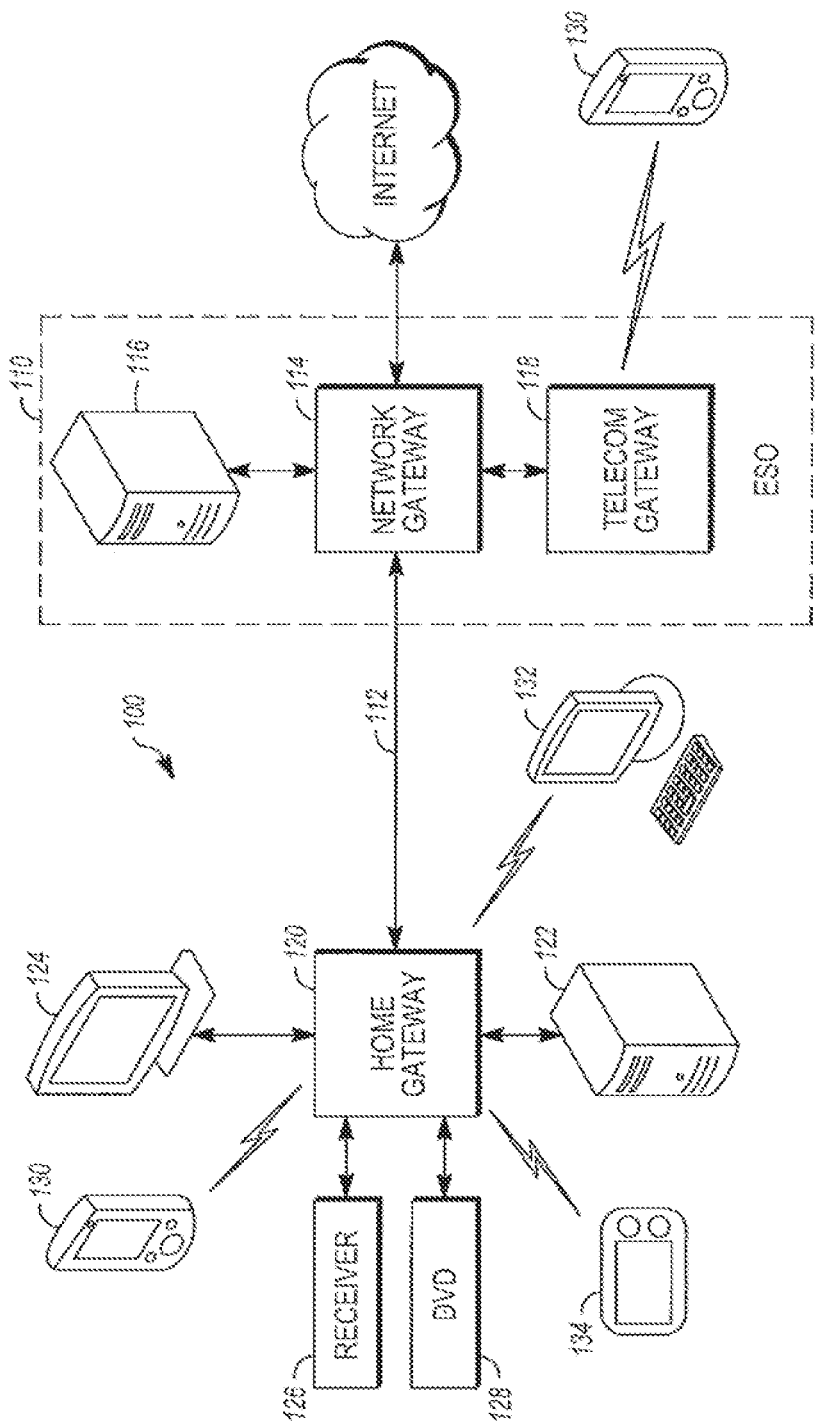
FIG. 1 depicts a block diagram of a system for detecting advertisements.

FIG. 1 depicts an embodiment of a system 100 for detecting advertisements. System 100 can be part of a communications network that can be used as a broadcast, ATSC, IPTV or IP Video delivery network that transports or delivers data files and multimedia content, including via multicast transmissions. The network environment can include an edge serving office (ESO) 110, which can be a head-end or central office of a multiple service provider (MSO) such as a cable, satellite, or telephone company. The ESO 110 can contain various communications equipment, such as one or more modulation/demodulation devices (not shown), a content server (not shown), and other communications equipment (not shown) that can provide video, data, and/or voice service to a user.

The communications equipment at the ESO 110 is operable to communicate with a home gateway 120 using a cable line network connection 112. In one example, the home gateway 120 includes the functionality of a set-top box (STB). The combination of the STB and the home gateway may be referred to as a set-top gateway. It is contemplated, however, that the STB may be separate from the home gateway. In this instance, the home gateway provides the network connection and the STB provides the media functionality. When the STB is separate from the home gateway 120, the STB may be connected to network connection 112 in parallel with the home gateway or may be connected to the home gateway 120 to receive IPTV packets from ESO 110 via the home gateway.

The communications equipment at the ESO 110 can be operable to communicate with one or more user devices through home gateway 120. The user devices may be customer premises equipment (CPE) devices such as a network attached storage (NAS) device 122, a digital television (DTV) receiver 124, a radio receiver 126, a digital video disc (DVD) player 128 including a streaming video facility, a mobile device 130, a computer 132 or a thermostat 134 or other Internet of things (IoT) device (e.g. an appliance, surveillance camera, light fixture, etc.) that connects to the Internet through the home gateway. These CPE devices can be located at or near a user's premises. In the example system, CPE device 130 is a mobile device that may have wireless telecommunications capability, even though it is designated as a "customer premise" device. In FIG. 1, only particular CPE devices 122, 124, 126, 128, 130, 132, and 134 are shown for illustrative purposes, but more or fewer can be coupled to the ESO 110 via the home gateway 120.

Still referring to FIG. 1, the communications equipment at the ESO 110 can communicate with one or more of the CPE devices 122, 124, 126, 128, 130, 132, and 134 through a transport network. Examples of ESO-to-Premises transport networks include one or more hybrid-fiber coaxial (HFC) networks and/or RF over Glass (RFoG) networks. An example HFC network can use a combination of optical fibers and coaxial cable as the network connection 112 to send data to and receive data from the communications equipment at the ESO 110. One or more RFoG networks can be deployed with existing HFC networks. RFoG networks typically include an all-fiber service from the ESO 110 to a field node, or home gateway 120, which is typically located at or near the user's premises. Coaxial cable can be used to connect the optical network units (ONUs) of an RFoG network to one or more user devices 122, 124, 126, 128, 130, 132, and 134. Additionally, any other wired or wireless networks can be used, including Passive Optical Networks (PON), Gigabit Passive Optical Networks (GPON), Digital Subscriber Line (DSL), Wi-MAX, or Ethernet.

In this example, the NAS device 122, DTV receiver 124, and radio receiver 126 may be coupled to the home gateway 120 via physical connections. The mobile device 130 may be coupled to the gateway 120 via a short-range radio frequency (RF), magnetic or optical connection (e.g. 802.11 WiFi, Bluetooth, Zigbee Radio Frequency for Consumer Electronics (RF4CE), near field communication (NFC) or infra-red (IR)), and the computer 132, thermostat 134 and DVD player 128, may be coupled to the home gateway 120 via a wired connection such as a universal serial bus (USB) cable, a FireWire cable, an Ethernet connection and/or via a short-range RF, magnetic or optical wireless connection. Each of these connections may be considered to be a separate communications channel.

The ESO 110 includes a network gateway 114 that provides access between a network and a data processing server 116 and, optionally to other networks, such as the Internet, and a telecommunications gateway 118 that provides telecommunications access to CPE devices such as mobile device 130 that is also coupled to the home gateway 120 via the short-range RF, magnetic or optical connection. The ESO 110 may include data sources (not shown), that provide content to the CPE devices via a standard cable television connection or as an IPTV or IP Video delivery network. These data sources, for example, may be servers coupled to the network gateway 114 in the same manner as the data processing server 116.

Figure 2:
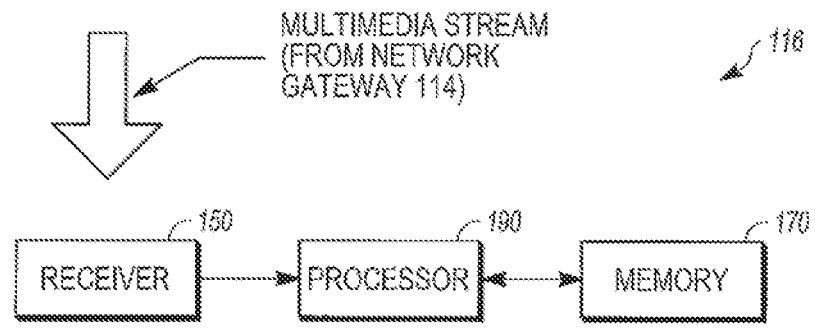
FIG. 2 depicts a block diagram of a data processing server of the system of FIG. 1.

An example of a data processing server 116 is illustrated in FIG. 2 and described below. Generally, data processing server 116 includes a receiver 150, a computer memory 170, and a processor 190. Additional details of server 116 are set forth below.

Receiver 150 accepts the input of multimedia content for server 116. Receiver 150 is connected to receive the audio and video data from the multimedia stream from network gateway 114. As a multimedia asset is streamed (such as during a television broadcast), the audio and video portions of the asset may be acquired with receiver 150 for processing by server 116. Receiver 150 may further acquire certain additional data, such as programming data for the multimedia asset. The form of receiver 150 is not limited. Receiver 150 may have a physical connection which receives the multimedia stream via communication by wire or optical fiber from network gateway 114. Alternatively, receiver 150 may be a wireless receiver which receives the multimedia stream via wireless communication. Receiver 150 may include one or more tuners to enable tuning the multimedia stream to different broadcast channels, in order to receive multimedia content from multiple different programs.

Memory 170 stores data for use in detecting advertisements. In one example, memory 170 contains a database of audio signatures from the multimedia content of interest. As a multimedia asset is received by receiver 150, the audio portion of the asset may be subdivided into time periods of a predetermined length. Audio signatures can be generated for each time period of the multimedia asset either as the asset is streamed or some time thereafter. These audio signatures can be stored in the database in memory 170 for use in identifying advertisements in other multimedia assets. The database may be large enough to be essentially unlimited in size and storage duration (e.g. a petabyte database), or may be a rolling database of audio signatures. In one example, audio signatures for every media asset (e.g., all television programs on all channels) are stored for a ten day period following their original streaming. Example processes for generating audio signatures are set forth in greater detail below. Suitable computer memories for use as memory 170 include, for example, one or more of Random Access Memory (RAM) EEPROM, magnetic media, optical media, etc.

Processor 190 is in communication with receiver 150 and memory 170. Processor 190 is programmed to determine whether a multimedia asset in the multimedia stream acquired by receiver 150 contains an advertisement. This determination is made using the audio data acquired by receiver 150 and the audio signatures stored in memory 170. Processor 190 is not limited to being a single processing component, but may comprise a combination of hardware and software modules programmed to perform the processes set forth below. Likewise, processor 190 need not refer to processing elements at a single location, but can refer to multiple separate processing elements connected by one or more network connections (such as in the distributed system described below).

In the example shown in FIGS. 1 and 2, the hardware components associated with the detection of advertisements are provided at the head-end (cable company) of system 100, i.e., in ESO 110, and more particularly, in data processing server 116. However, it will be understood that the same components could be provided at the customer end, e.g. in home gateway 120 and/or in an STB. Moreover, the hardware components for detecting advertisements could be distributed between the head-end and the customer end. For example, certain processing functions, such as generation of audio signatures, could be performed at the home gateway 120 and/or STB, and other processing functions, such as storage and comparison of audio signatures, could be performed at ESO 110. In such an example, network connection 112 and network gateway 114 can facilitate communication of audio signatures and advertisement information between home gateway 120 and the ESO 110.

Figure 3:
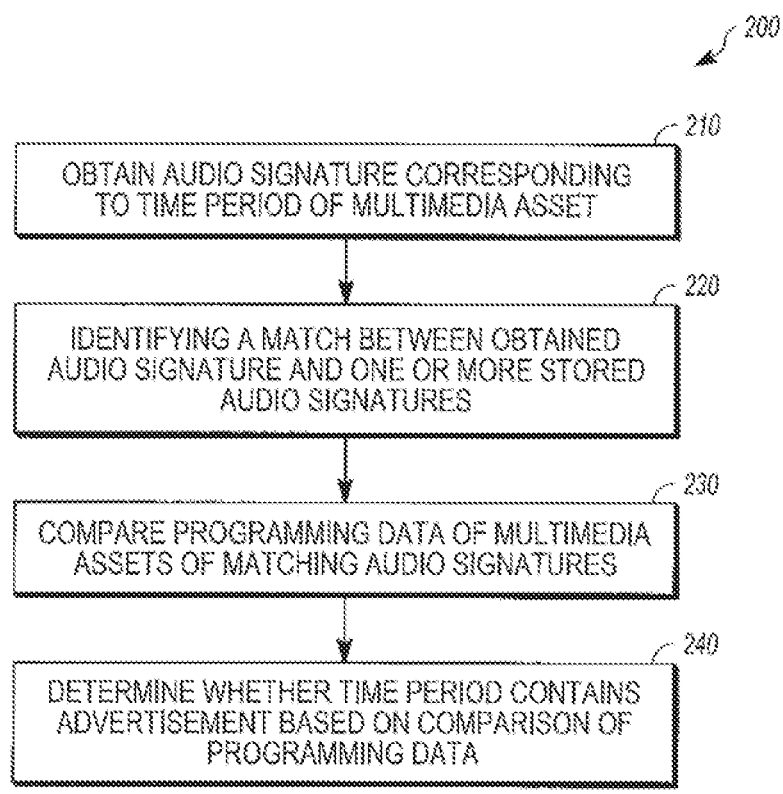
FIG. 3 depicts a flowchart including steps of a method for detecting advertisements.

FIG. 3 depicts a method 200 for detecting advertisements. Generally, method 200 includes obtaining an audio signature, identifying a matching audio signature, comparing programming data of the audio signatures, and determining the presence of an advertisement. Additional details of method 200 are set forth below, and may be described with respect to the components of system 100.

In step 210, an audio signature is obtained. The audio signature corresponds to a time period of a multimedia asset of interest. The length of the time period may be predetermined. In one example, as a multimedia asset is received by receiver 150, the audio portion of the asset is subdivided into time periods of a predetermined length, such as ten second increments. It will be understood that other time periods may be used.

The audio signature may be a complete audio data file for the audio portion of the multimedia asset during the time period, or may be a processed or compressed version of the audio portion of the multimedia asset during the time period. In one example, processor 190 creates the audio signature by applying an audio fingerprinting function to an audio data file representing the audio of the multimedia asset during the time period. Suitable audio fingerprinting functions for use in generating the audio signature will be understood from the description herein, and include, for example, the Echoprint music identification system or other function that characterizes the audio segment by its frequency components. Compression may be used to form the audio signature in order to limit the size of the audio signature while maintaining sufficient characteristics of the underlying audio data to enable a unique or nearly unique identification of the audio signature. Accordingly, an example fingerprinting function may perform a frequency transform operation such as, without limitation, a fast Fourier transform (FFT), discrete cosine transform (DCT) or a Hadamard transform and then compress the result to obtain a descriptor for the sampled segment. A hash function may be applied to the descriptor to identify a location in a hash table corresponding to the descriptor. Alternatively, the descriptors may be stored in a binary tree based on characteristics of the descriptors or in another type of easily searchable database. The descriptor may be stored with electronic program guide (EPG) information identifying the multimedia asset and time frame from which the underlying audio segment was extracted.

In step 220, a match between audio signatures is identified. The match is identified by comparing the audio signature obtained in step 210 with a database of previously obtained audio signatures stored in memory 170. When descriptors are hashed and stored into a hash table, other similar descriptors may be hashed to the same bin so that all descriptors in the bin may be treated as matching descriptors. The previously obtained audio signatures correspond to time periods of other multimedia assets, the time periods having the same lengths as the length of the time period of the audio signature obtained in step 210.

Figure 4:
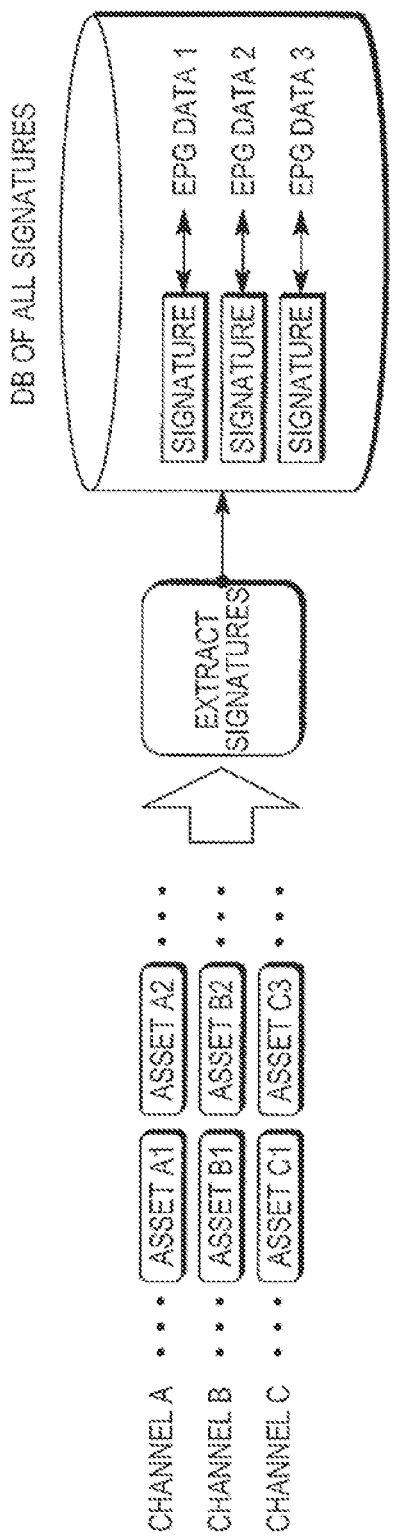
FIG. 4 depicts an example of a process for generating a database of audio signatures.

The database of audio signatures may contain audio signatures corresponding to all portions of a multimedia stream, including all multimedia assets received in a particular time interval, for example, the previous ten days. In one example shown in FIG. 4, the database contains audio signatures for all television programs (e.g. Assets A1, A2, B1, B2, C1, C2, etc.) drawn from all television channels (e.g. Channels A, B, C, etc.) over all hours of the day. Such a database will include audio signatures for portions of television programs and audio signatures for advertisements located within television programs. These signatures may be stored in the database in association with the EPG data, which is described in greater detail below.

The comparison of audio signatures may be performed in real time as a multimedia asset is streamed and/or as audio signatures are obtained, or the comparison may occur with any previously obtained audio signature stored in the database. The comparison may be performed between the obtained audio signature and each (other) stored audio signature in the database to identify all matches. A match may be identified in audio signatures when the timing and frequency peaks of one audio signature are sufficiently similar or identical to the timing and frequency peaks of other audio signatures.

In step 230, programming data of the matching audio signatures may be compared. In one example, receiver 150 receives programming (EPG) data of the multimedia asset in addition to the audio and video data of the multimedia asset. In one implementation, this programming data is stored in memory 170 in connection with any audio signatures corresponding to the corresponding audio segment extracted from the multimedia asset. Processor 190 may then compare programming data of any matching audio signatures to identify differences.

Programming data may include metadata, or descriptive data, of the asset. Categories of information that may be included in the programming data received with receiver 150 include, for example, the genre of the asset, the title of the asset, the episode title for the asset, a description of the asset, a channel or service on which the asset is broadcast or streamed, and a time (including date) at which the asset is broadcast or streamed.

In step 240, it is determined whether the multimedia asset contains an advertisement. By comparing programming data of assets with matching audio signatures, differences in the programming data can be identified. In one example, processor 190 determines whether or not the time period to which the obtained audio signature corresponds to an advertisement based on the differences between the programming data of the obtained audio signature and any matching audio signatures. Specific examples of determinations are discussed in greater detail below.

For one example, it is understood that the same advertisement may be streamed in multiple different multimedia assets, such as the same commercial being shown during different television programs. Accordingly, when matching audio signatures occur in a number of multimedia assets having different titles, it may be determined that the obtained audio signature corresponds to a time period containing an advertisement.

For another example, it is understood that the same advertisement may be streamed on multiple different channels. Accordingly, when matching audio signatures occur in multimedia assets streamed on different channels, it may be determined that the obtained audio signature corresponds to a time period containing an advertisement. Such a determination may also be limited to assets having different titles or genres, to avoid confusion in situations where the same television program or segment is broadcast on different channels (such as during television news broadcasts, for example).

Advertisements occurring in multimedia assets are generally limited in length, such as being limited to thirty or sixty seconds of time. In view of this limitation, multiple consecutive audio signatures from respective multimedia assets may be compared as a group to determine whether they contain an advertisement. For example, a plurality of audio signatures corresponding to consecutive time periods of a multimedia asset may be obtained in the manner set forth above. Matches may then be identified between the series of consecutive audio signatures and stored audio signatures. The determination of the presence of an advertisement may be made based on the length of time covered by the matching audio signatures. When the series of matching audio signatures is below a predetermined number, it may be determined that the consecutive time periods to which the matching audio signatures correspond contains an advertisement. Conversely, when the series of matching audio signatures is above a predetermined number, it may be determined that the consecutive time periods to which the matching audio signatures correspond do not contain an advertisement but may, instead, correspond to the same program being carried by multiple sources. The predetermined number of audio signatures may be selected based on the length of time covered by the audio signatures and the length of a typical advertisement. For example, for audio signatures corresponding to ten second increments, the predetermined number may be three or six, corresponding to the typical thirty or sixty second lengths of advertisements.

While method 200 may be used to identify the location of an advertisement in a multimedia asset, this does not necessarily provide information regarding the location of the beginning or ending of the advertisement. Accordingly, it may be desirable to perform additional steps to identify the start and end of an advertisement. Examples of such identification are discussed below.

In addition to audio data, video data may be used to identify the start and end of advertisements. Accordingly, in addition to acquiring audio data of a multimedia asset, receiver 150 may further acquire video data of the multimedia asset. In one implementation, the video data includes a plurality of images (or frames). This video data may be processed and stored in a manner similar to audio data. The actual images that make up the video may be stored, or the images may be processed or compressed prior to storage. In one example, processor 190 processes the images to create a data file of the color-layout breakdown of each image, which is then stored. Such processing may be used in order to limit the size of the video data being stored while maintaining sufficient characteristics of the underlying video data to enable a unique or nearly unique identification of the video data. The processed images may be stored in a database in memory 170 (similar to the audio signatures), or may be stored in a separate memory. As with the audio signatures, the video data may be stored in association with programming data of the multimedia asset from which the video data was acquired.

In another implementation, the system may capture image segments representing blank frames. These blank frames are typically transmitted before and after each advertisement. The system may store a time index of the blank frames for each multimedia asset. This time index may then be correlated with the time data stored with the audio signatures to delimit the matching segments by two sets of blank frames. The sets of blank frames delimiting the advertisement are desirably limited to those separated by an amount of time corresponding to the length of an advertisement, however, as advertisements may include internal blank frames.

When it is determined that a time period of the multimedia asset contains an advertisement, video data for the time periods of the matching audio signatures are aligned with one another. In other words, a series of processed images (or frames) of the video data for the time period of the obtained audio signature is placed in a sequence alongside a series of processed images (or frames) of the video data for the time periods of any matching audio signatures.

After the video data is aligned, one need only work backwards to identify the beginning of the advertisement. For example, the video data for time periods preceding the matched audio signatures is compared with one another. Once the beginning of the advertisement is reached, the video and/or audio data will begin to differ, due to the differences in the multimedia assets in which the advertisement is located. Thus, the beginning of the advertisement may be identified when the video and/or audio data in the time period preceding one of the matching audio signatures becomes sufficiently different from the video and/or audio data in the time period preceding another one of the matching audio signatures. The end of the advertisement may be identified using substantially the same process. It may be desirable to compare uncompressed image data from two multimedia assets as the same frame may be compressed differently in two data streams.

Figure 5:
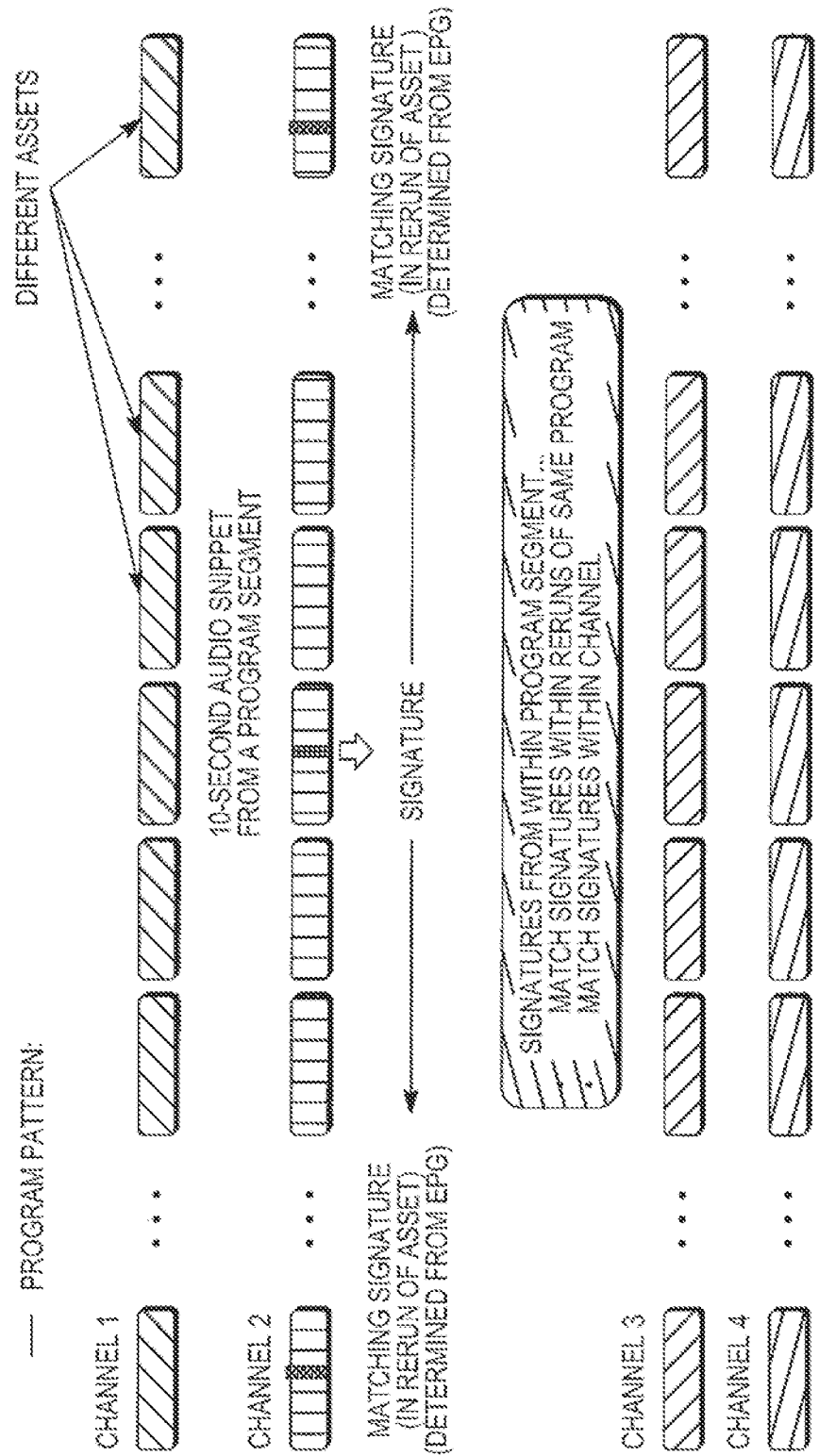
FIGS. 5, 6, and 7 depict an example of a process for determining whether a portion of a multimedia asset contains an advertisement.
Figure 6:
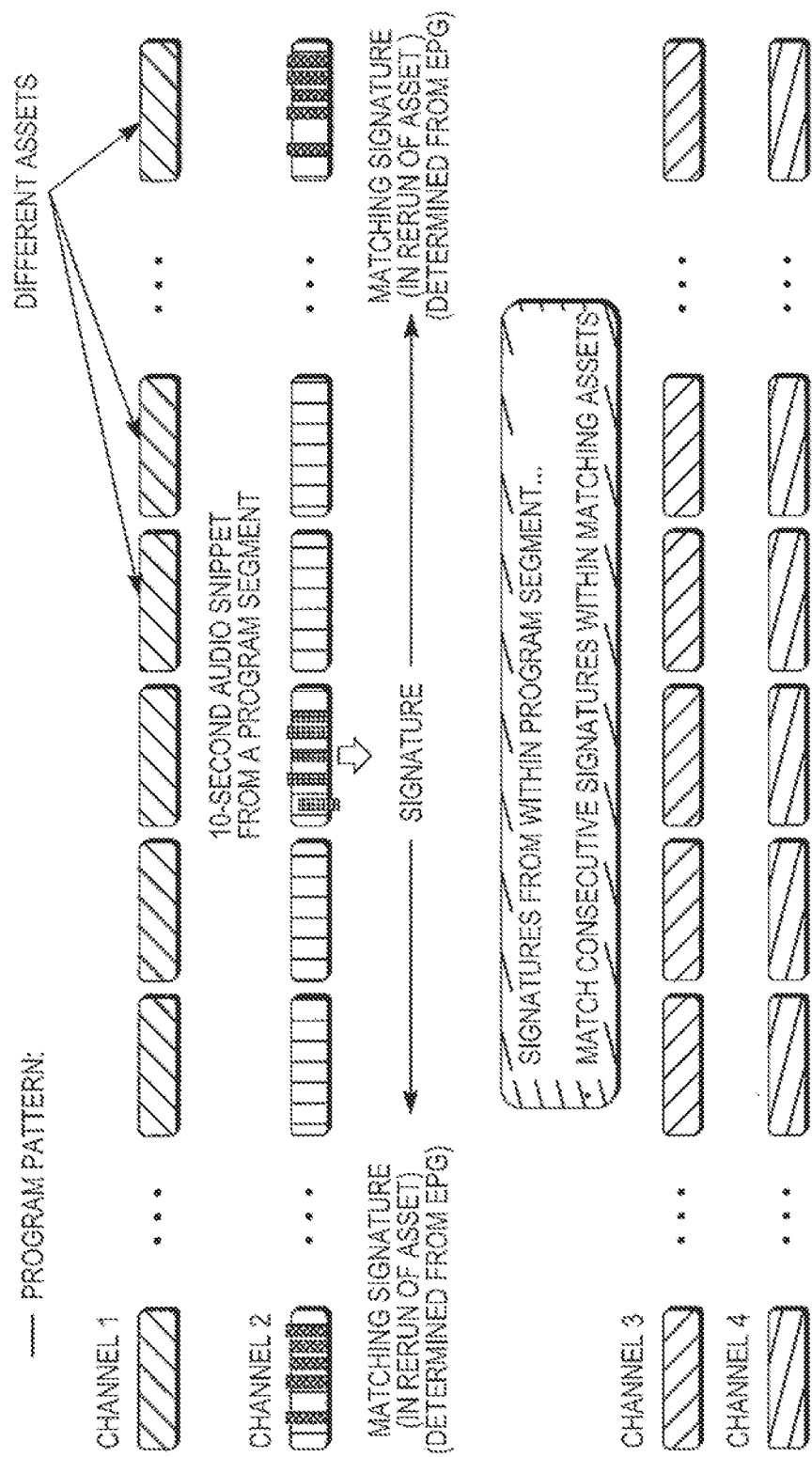
Figure 7:
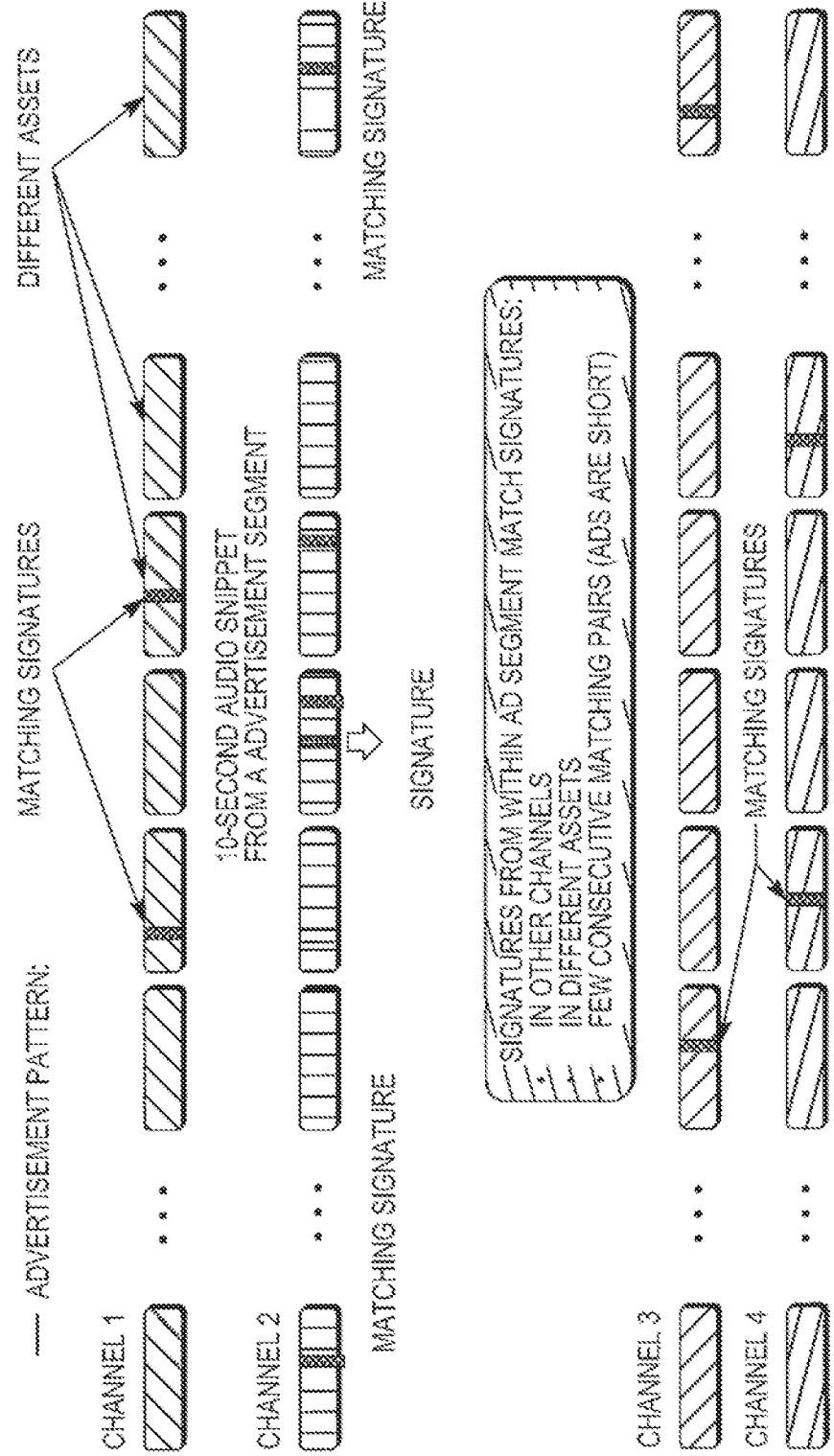

FIGS. 5-7 illustrate an example of determining the location of advertisements in a multimedia stream. As shown in FIG. 5, a program pattern is depicted for Channel 1, Channel 2, Channel 3, and Channel 4. Different assets are depicted in each channel. In the example shown in FIG. 5, an audio signature is obtained for a ten second time period of a multimedia asset on Channel 2. A matching audio signature is found in a rerun of the asset (such rerun being identified, e.g., using programming data obtained from an electronic program guide ("EPG")). As expected, audio signatures from within a program segment match corresponding audio signatures within reruns of the same program on the same channel. A single matching audio signature, however, may not be sufficient to identify a matching advertisement or program. An advertisement may be identified based on audio signatures covering less that the length of an advertisement (e.g. 30, 60 or 90 seconds) when a smaller number of segments are found to match (e.g. segments covering 20 seconds) and the EPG information associated with the segments is different.

FIG. 6 illustrates how program segments can be determined from the pattern of occurrences of an audio signature. In FIG. 6, the same program pattern is depicted for Channel 1, Channel 2, Channel 3, and Channel 4, with different assets in each channel. In the example shown in FIG. 6, five audio signatures are obtained for consecutive ten second time periods of a multimedia asset on Channel 2. A matching series of audio signatures is found in a rerun of the asset. As expected, consecutive signatures from within a program segment match corresponding consecutive signatures within matching assets. Accordingly, it may be determined that the audio signatures do not contain an advertisement. This determination may be made, for example by comparing the EPG data of the multimedia assets or by the number of consecutive matching signatures being greater than an advertisement time, for example, 60 or 90 seconds.

FIG. 7 illustrates how ad segments can be determined from the pattern of occurrences of a signature. In FIG. 7, the same program pattern is depicted for Channel 1, Channel 2, Channel 3, and Channel 4, with different assets in each channel. In the example shown in FIG. 5, an audio signature is obtained for a ten second time period of a multimedia asset on Channel 2. Matching audio signatures are found in multiple assets on Channels 1, 3, and 4 which have different EPG descriptions from the asset on Channel 2. Accordingly, it may be determined that the audio signature contains an advertisement, because it matches signatures in other channels, in different assets. Still further, if there are few consecutive matching audio signature pairs, it may be determined that the audio signature contains an advertisement, due to the limitation on length of advertisements.

From the examples shown in FIGS. 5-7, an audio signature may be classified as containing a segment of a television program if the signature matches occur only in assets with the same title; i.e., assets corresponding to the same program, or if signature matches occur in many consecutive signatures. Conversely, an audio signature may be classified as containing an advertisement if the signature matches occur in various assets with different titles or different channels, and/or if signature matches occur in a small number of consecutive signatures. It will be understood that these examples of distinguishing a television program segment from an advertisement are provided for the purposes of illustration, and are not limiting. To the contrary, other comparisons between programming data may be relied on to distinguish a television program segment from an advertisement, as would be understood from the description herein.

FIGS. 8-11 illustrate an example method for identifying the beginning of an advertisement in a multimedia asset. In this example, the audio signature of a media asset has already been determined to contain an advertisement, using any of the techniques set forth above. When the time period of the multimedia asset has been classified as containing an advertisement, video frame alignment is performed to align the frames of the segment of interest with the video frames of the segment of the asset whose audio signature generated a match. Following this alignment, consecutive frames before the segments are compared with one another until low similarity is found. Likewise, consecutive frames after the segments are compared until low similarity is found. When low similarity is found, it may be presumed that the last matching sets of video frames on either side of the segment of interest constitute the beginning and end of the advertisement.

Figure 8:
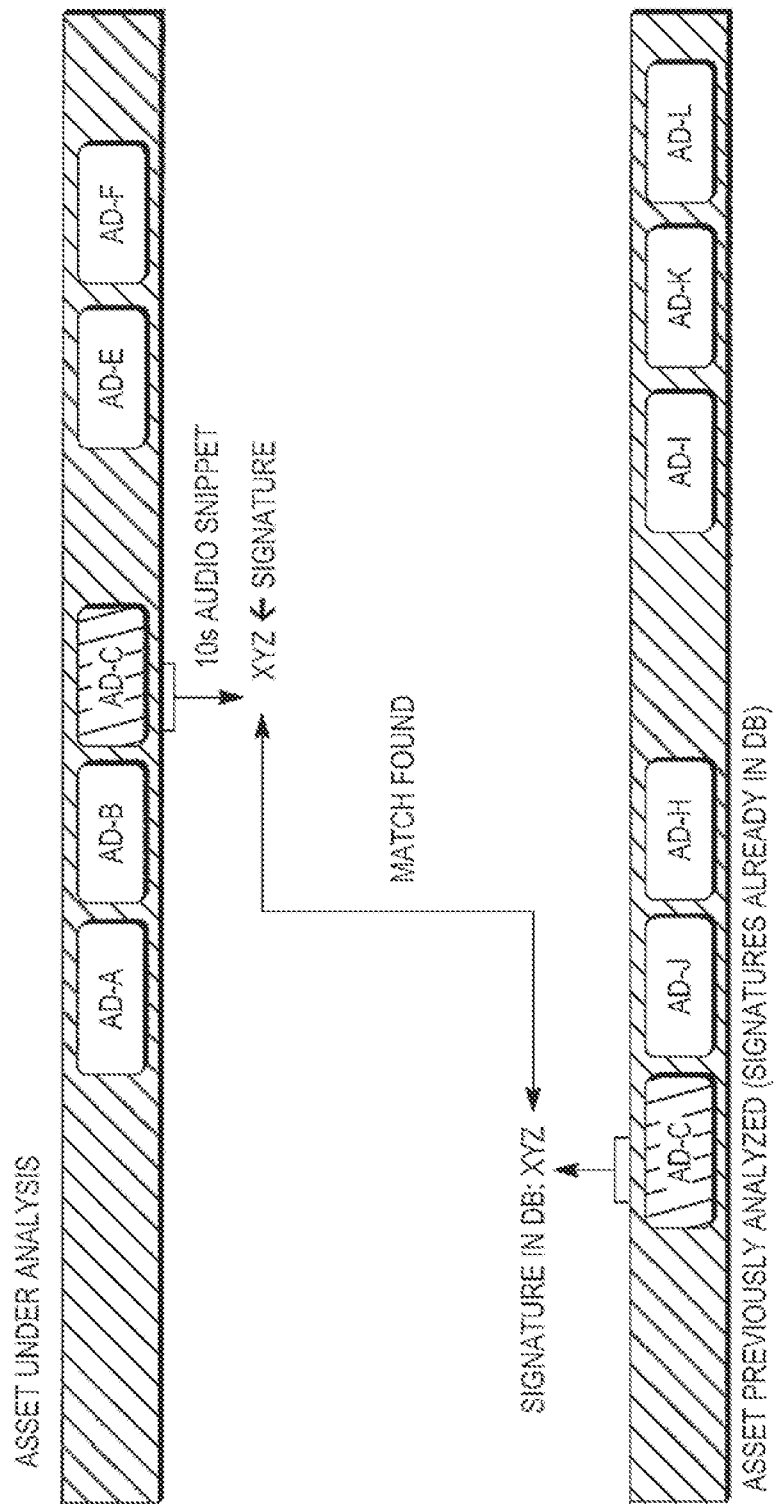
FIGS. 8, 9, 10, and 11 depict an example of a process for identifying the beginning of an advertisement in a multimedia asset.

As shown in FIG. 8, to determine if a segment is classified as an "Ad," an audio segment is compared with an audio segment of one of the matching assets. "Ad-C" represents a 10 second audio snippet having an audio signature depicted as "XYZ". In the example shown in FIG. 8, a match is identified with a signature "XYZ" in a database of audio signatures corresponding to a previously-analyzed multimedia asset.

Figure 9:
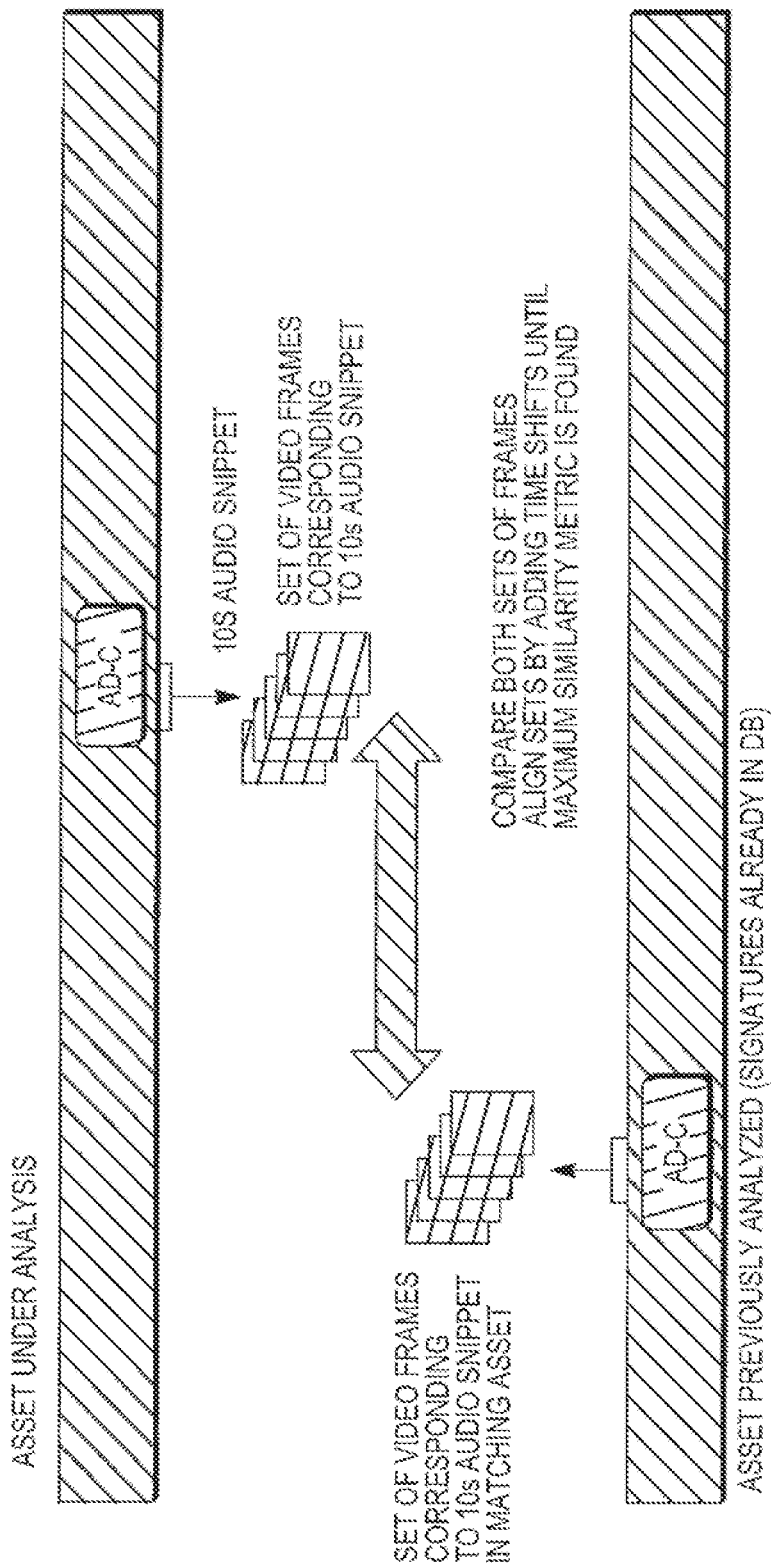

As shown in FIG. 9, a set of video frames corresponding to the 10 second audio snippet are compared with a set of video frames of the matching audio segment. Both sets of video frames are aligned with one another. In one example, the sets of video frames are aligned by adding time shifts until maximum similarity metric is found.

Figure 10:
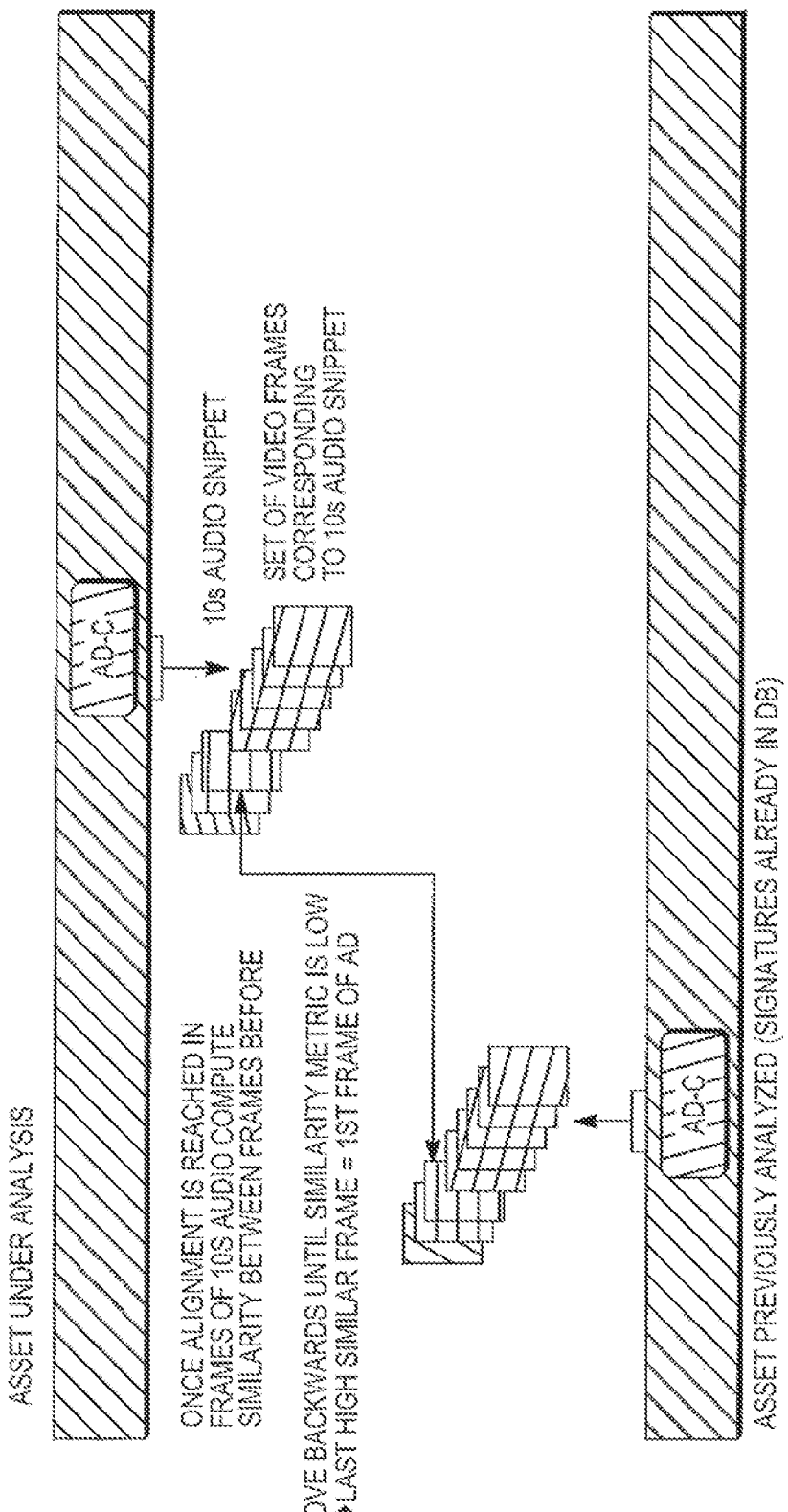

As shown in FIG. 10, once alignment is reached in the sets of video frames corresponding to the matching audio signatures, the surrounding video frames are compared. In one example, a similarity between frames before the aligned sets of video frames is calculated. Video frames in the preceding time period are compared, moving backwards in time until similarity of the video frames is low. At this point, the last set of similar frames are identified as the first frame of the advertisement.

Figure 11:
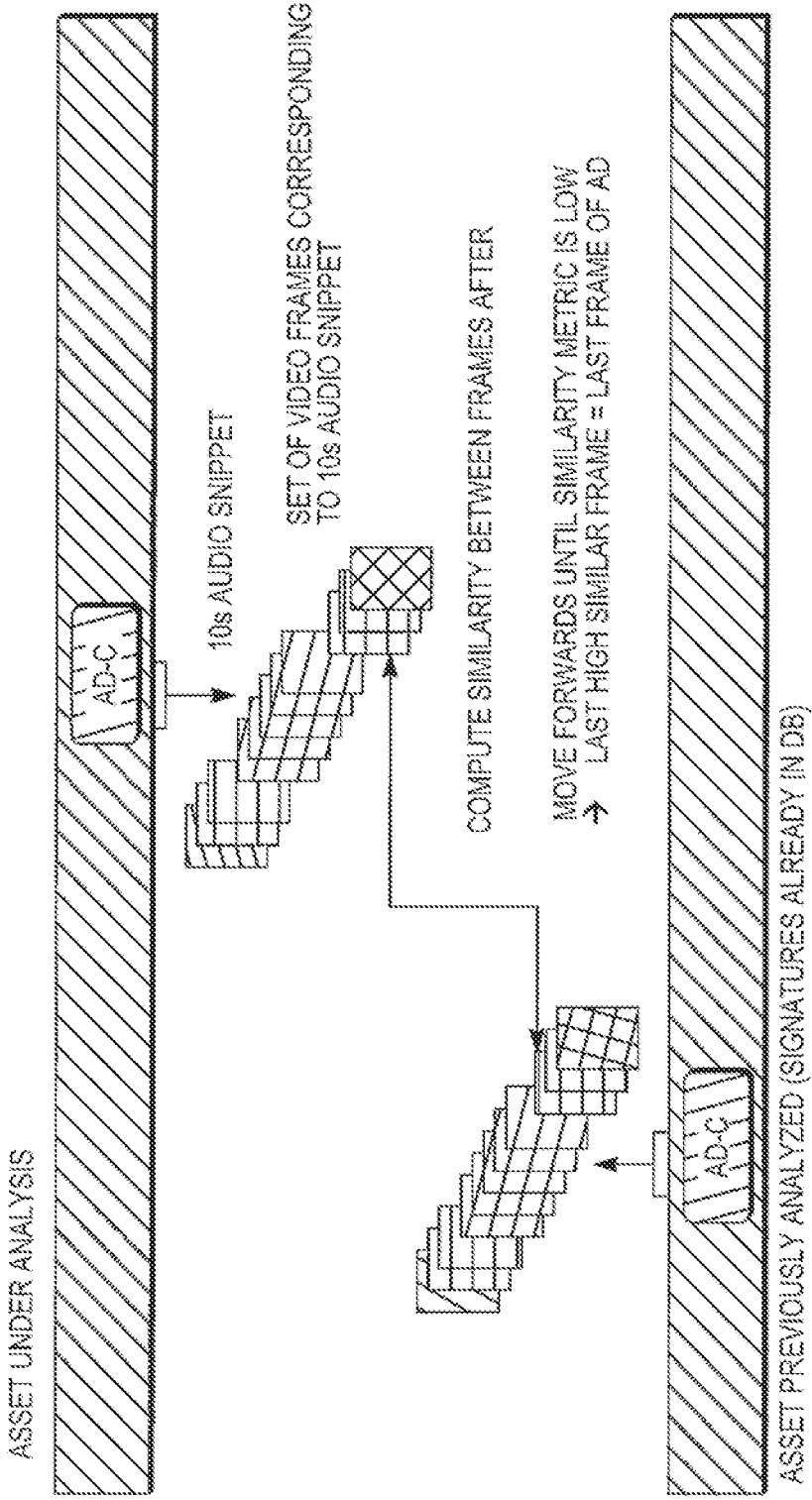

As shown in FIG. 11, a similarity between frames after the aligned sets of video frames is calculated. Video frames in the following time period are compared, moving forward in time until similarity of the video frames is low. At this point, the last set of similar frames are identified as the last frame of the advertisement.

Figure 12:
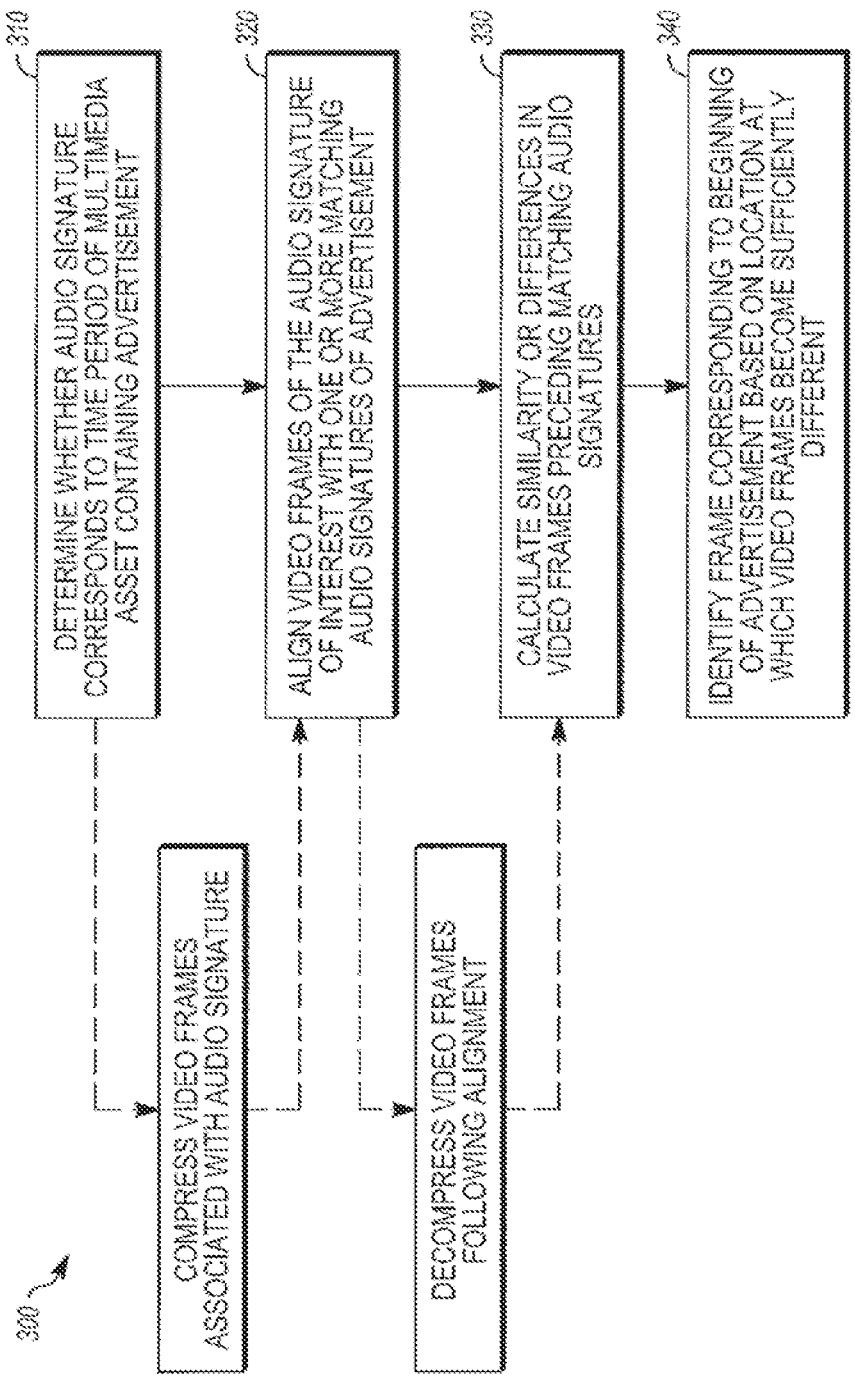
FIG. 12 depicts a flowchart including steps of a method for identifying the beginning of an advertisement in a multimedia asset.

FIG. 12 depicts a flowchart illustrating an example method 300 for identifying the beginning of an advertisement in a multimedia asset. Generally, method 300 includes determining the presence of an advertisement, aligning video frames of the advertisement, calculating similarity of preceding video frames, and identifying the beginning of the advertisement. Additional details of method 300 are set forth below.

In step 310, it is determined whether an audio signature corresponds to a time period of a multimedia asset containing an advertisement. Such a determination may be made by comparing the audio signature to one or more matching audio signatures of other multimedia assets using any of the examples set forth in this application.

In step 320, video frames of the audio signature of interest and the one or more matching audio signatures are aligned. The video frames may be aligned in an uncompressed (i.e. native) form, or may be aligned as compressed frames. In one example shown in FIG. 12, the video frames may have been compressed prior to alignment. Depending on the compression techniques used, it may be desirable to decompress compressed video frames prior to alignment. To align video frames, chrominance information and especially color layout information (i.e. information regarding the position of colors or spectrums of colors in the frame) of a sequence of video frames associated with the audio signature of interest is compared with corresponding information from a sequence frames corresponding of the one or more matching audio signals. It may be advantageous to compare only the chrominance information as there is typically less chrominance information than luminance information in a frame, especially when the frame is in 4:2:0 format. In one implementation, the chrominance information is further sub-sampled to provide the color layout information. One of the sequences of video frames may be offset in time until the color layout information of the sequence of video frames associated with the audio signature of interest matches the corresponding information of the sequence of video frames from the one or more matching audio signals.

In step 330, preceding video frames are reviewed. Once the video frames of the advertisement are aligned, it may be presumed that the sequences of video frames will remain matching as long as the content remains identical, or in other words, as long as both sequences correspond to the same advertisement. Accordingly, to identify the beginning of the advertisement, video frames preceding the sequence of video frames corresponding to the matching audio signatures are compared with one another, and a similarity or dissimilarity is calculated. Depending on the compression techniques used, this comparison may be performed with compressed video frames, or may be performed with uncompressed video frames, in order to avoid inaccuracies due to the same video frame being compressed differently in two different data streams. The similarity or dissimilarity may be calculated based on differences in the color layout information of the respective sequences of video frames.

In step 340, the beginning of the advertisement is identified. When the similarity of the sequences of video frames falls below a predetermined level, or conversely the dissimilarity rises above a predetermined level, it may be determined that the content in the respective sequences of video frames is no longer sufficiently similar. From this, it may further be determined that the start of the advertisement has been identified. By identifying the first pair of similar frames, the beginning of the advertisement may be identified.

While method 300 refers to the identification of the beginning of an advertisement, it will be understood that virtually the same steps may be used to identify the ending of an advertisement. Steps 310 and 320 may remain the same, and in step 330, video frames following the sequence of video frames corresponding to the matching audio signatures may be compared with one another.

Once an advertisement is identified as set forth herein, metadata may be generated and stored in association with the advertisement audio signature identified as containing an advertisement. Such metadata may be useful, for example, to assist in identifying recurrences of the advertisement in other multimedia assets, or to assist in the location of related advertisements in future multimedia assets. In one example, audio, video, or text data from portions the media asset (e.g. television program) surrounding the particular advertisement may be collected and stored to provide metadata for the advertisement. In another example, closed captions of the segment identified as an advertisement may be collected and stored to provide metadata for the advertisement. In yet another example, other key terms, including the name of the advertiser, may be extracted from the advertisement and used as metadata for the advertisement.

While the examples have been described above in connection with specific devices, apparatus, systems, and/or methods, it is to be clearly understood that this description is made only by way of example and not as limitation. Particular embodiments, for example, may be implemented in a non-transitory computer-readable storage medium for use by or in connection with an instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented, and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. Accordingly, the specification and figures are to be regarded in an illustrative rather than a restrictive sense, and all such modifications are intended to be included within the scope of the claims. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method comprising:
   obtaining a plurality of audio signatures corresponding to consecutive time periods of a multimedia asset;
   identifying matches between the plurality of obtained audio signatures and a plurality of stored audio signatures, the plurality of stored audio signatures corresponding to consecutive time periods of a plurality of other multimedia assets;
   determining whether the consecutive time periods of the multimedia asset contain an advertisement based on a number of the plurality of obtained audio signatures that consecutively match with the plurality of stored audio signatures; and
   in response to determining that the consecutive time periods of the multimedia asset contain the advertisement, identifying a beginning of the advertisement when a first plurality of video frames of the multimedia asset for a time period preceding a time period of the obtained audio signature is sufficiently different from a second plurality of video frames of the multimedia asset for a time period preceding one or more time periods preceding respective time periods of the one or more of the consecutively matching audio signatures.

2. The method of claim 1, wherein the obtaining comprises applying an audio fingerprinting function to consecutive segments of an audio data file representing audio of the multimedia asset during the consecutive time periods to create the plurality of obtained audio signatures.

3. The method of claim 1, wherein the multimedia asset comprises a television program.

4. The method of claim 1, wherein the identifying comprises:
   generating a database containing the plurality of stored audio signatures; and comparing the plurality of obtained audio signatures to the plurality of stored audio signatures in the database to identify the matches.

5. The method of claim 1, wherein the determining comprises:
determining that the consecutive time periods of the multimedia asset contain an advertisement when the number of consecutively matching audio signatures is greater than a first predetermined number and less than a second predetermined number.

6. The method of claim 1, wherein the identifying the beginning of the advertisement includes:
aligning video frame data for the time period of an obtained audio signature with video frame data for the time period of one or more of the consecutively matching audio signatures;
comparing the first plurality of video frames of the multimedia asset for a time period preceding the time period of the obtained audio signature with the second plurality of video frames of the multimedia asset for the one or more time periods preceding the respective time periods of the one or more of the consecutively matching audio signatures.

7. The method of claim 1, wherein determining whether the consecutive time periods of the multimedia asset contain an advertisement is based on a length of time covered by the consecutively matching audio signatures.

8. The method of claim 7, wherein determining whether the consecutive time periods of the multimedia asset contain an advertisement comprises determining whether the length of time covered by the consecutively matching audio signatures is less than, equal to, or greater than a length of time of the advertisement.

9. The method of claim 1, wherein determining whether the consecutive time periods of the multimedia asset contain an advertisement comprises comparing the number of consecutively matching audio signatures to a predetermined number.

10. The method of claim 1, wherein at least one of the plurality of obtained audio signatures comprises an uncompressed audio data file of the multimedia asset or a compressed version of the audio data file of the multimedia asset.

11. The method of claim 2, wherein applying the audio fingerprinting function comprises characterizing an audio segment of the audio data file by its frequency component.

12. The method of claim 1, wherein identifying the matches comprises comparing hashed descriptors.

13. The method of claim 1, wherein identifying the matches is performed in real time as the plurality of audio signatures are obtained.

14. The method of claim 1, wherein obtaining the plurality of audio signatures comprises obtaining the plurality of audio signatures corresponding to consecutive time periods of a plurality of multimedia assets.

15. The method of claim 1, further comprising:
aligning data of the multimedia asset with data of at least one multimedia asset of the other multimedia assets, based on the consecutively matching audio signatures.

16. The method of claim 1, wherein at least one obtained audio signature of the plurality of obtained audio signatures comprises a compressed version of the audio data file of the multimedia asset, the method further comprising:
aligning data of the multimedia asset with data of at least one multimedia asset of the other multimedia assets, based on the consecutively matching audio signatures.

17. The method of claim 16, further comprising decompressing the compressed version of the audio data file prior to aligning the data of the multimedia asset with the data of at least one multimedia asset of the other multimedia assets.

18. The method of claim 1, further comprising generating metadata of the consecutively matching audio signatures.

19. The method of claim 18, further comprising storing the metadata of the consecutively matching audio signatures.

20. A system comprising:
one or more processors, one or more computer-readable memories, one or more computer-readable tangible storage devices, and instructions stored on at least one of the one or more storage devices for execution by at least one of the one or more processors via at least one of the one or more memories, the instructions comprising:
instructions to obtain a plurality of audio signatures corresponding to consecutive time periods of a multimedia asset;
instructions to identify matches between the plurality of obtained audio signatures and a plurality of stored audio signatures, the plurality of stored audio signatures corresponding to consecutive time periods of a plurality of other multimedia assets; and
instructions to determine whether the consecutive time periods of the multimedia asset contain an advertisement based on a number of the plurality of obtained audio signatures that consecutively match with the plurality of stored audio signatures; and
in response to determining that the consecutive time periods of the multimedia asset contain the advertisement, instructions to identify a beginning of the advertisement when a first plurality of video frames of the multimedia asset for a time period preceding a time period of the obtained audio signature is sufficiently different from a second plurality of video frames of the multimedia asset for a time period preceding one or more time periods preceding respective time periods of the one or more of the consecutively matching audio signatures.

* * * * *